(12) United States Patent
Culver

(10) Patent No.: US 10,651,453 B2
(45) Date of Patent: May 12, 2020

(54) ELECTRODE ASSEMBLY WITH PROJECTING TAB FOR BATTERY AND METHODS OF FORMING SAME

(71) Applicant: Custom Electronics, Inc., Oneonta, NY (US)

(72) Inventor: Duncan Culver, Howell, NJ (US)

(73) Assignee: Custom Electronics, Inc., Oneonta, NY (US)

( * ) Notice: Subject to any disclaimer, the term of this patent is extended or adjusted under 35 U.S.C. 154(b) by 90 days.

(21) Appl. No.: 16/137,940

(22) Filed: Sep. 21, 2018

(65) Prior Publication Data

US 2020/0099037 A1 Mar. 26, 2020

(51) Int. Cl.
*H01M 2/26* (2006.01)
*H01M 10/04* (2006.01)

(52) U.S. Cl.
CPC ......... *H01M 2/263* (2013.01); *H01M 10/049* (2013.01); *H01M 10/0431* (2013.01)

(58) Field of Classification Search
CPC . H01M 2/263; H01M 10/0431; H01M 10/049
See application file for complete search history.

(56) References Cited

U.S. PATENT DOCUMENTS

| | | | | |
|---|---|---|---|---|
| 9,373,865 B2* | 6/2016 | Holl | ..................... | B23K 26/032 |
| 10,516,150 B2* | 12/2019 | Masson | ............ | H01M 10/0525 |
| 2013/0252054 A1* | 9/2013 | Barone | ................. | H01M 2/263 |
| | | | | 429/94 |
| 2017/0092925 A1* | 3/2017 | Shiu | ...................... | H01M 2/263 |

FOREIGN PATENT DOCUMENTS

DE 202008041713 A1 3/2010

* cited by examiner

*Primary Examiner* — Stewart A Fraser
(74) *Attorney, Agent, or Firm* — Hoffman Warnick LLC

(57) ABSTRACT

Embodiments of the disclosure provide an electrode assembly including: a jelly roll electrode having a plurality of electrode sheets, the plurality of electrode sheets including an anode sheet, a cathode sheet, and a separator separating the anode sheet from the cathode sheet, an electrolyte disposed between the anode sheet and the cathode sheet of the jelly roll electrode, and a tab projecting from an axial end of the plurality of electrode sheets, the tab including a subsection of the plurality of electrode sheets contacting each other at an axial end of the jelly roll electrode; and a first conductive tab coupled to the tab of the electrode assembly, wherein the first conductive tab is configured to electrically couple the electrode assembly to a battery terminal.

20 Claims, 9 Drawing Sheets

ELECTRODE ASSEMBLY WITH PROJECTING TAB FOR BATTERY AND METHODS OF FORMING SAME

BACKGROUND

Technical Field

The present disclosure relates to electrode assemblies for a battery. Specifically, embodiments of the disclosure provide electrode assemblies with a projecting tab and methods of forming the same.

Related Art

Batteries provide electrical energy in electronic systems. An electrode assembly for a battery includes two electrodes (anode and cathode, respectively), a separator between the electrodes, and opposite-polarity terminals for connecting the battery to the circuit. The fundamental elements of a battery may be formed using a wide variety of architectures. One such architecture is the wound cylindrical cell, adapted to fit inside a cylindrical housing. Wound cylindrical cells typically comprise several layers of films. The two active electrode materials of the cell (anode and cathode) may be coated onto thin layers of metal foil, e.g., having a thickness of approximately nine to approximately twenty micrometers. The metal foil may include aluminum for the cathode and copper for the anode, and/or may include other metals. These electrodes are interleaved with an electronic insulating porous film, known as a separator. The layers are wound together into a "jelly-roll" shape. Wound cylindrical cells are thus more commonly known in the art as jelly roll electrode assemblies.

To create a battery, the jelly roll electrode assembly may be sealed inside a metal casing. Connections must be made from the current-collector foils of the electrodes to the terminals of the battery, which may be formed on or within the metal casing. Forming such a connection has proven to be a technical challenge, as improving some aspects of the connection may require sacrificing other qualities, e.g., electrical conductivity, shock resistance, real estate, seal strength, cell lifespan, and/or manufacturability. Conventional cell architectures have proven unsatisfactory for providing these features in accordance with manufacturer and consumer criteria. Some terminal components located between the electrode assembly and the cell housing may negatively affect electrical behavior within the cell housing. Even when the terminals have minor effects on battery performance, the terminal components will inevitably occupy additional space in the battery architecture.

SUMMARY

A first aspect of the disclosure provides an electrode assembly including: an electrode assembly including: a jelly roll electrode having a plurality of electrode sheets, the plurality of electrode sheets including an anode sheet, a cathode sheet, and a separator separating the anode sheet from the cathode sheet, an electrolyte disposed between the anode sheet and the cathode sheet of the jelly roll electrode, and a tab projecting from an axial end of the plurality of electrode sheets, the tab including a subsection of the plurality of electrode sheets contacting each other at an axial end of the jelly roll electrode; and a first conductive tab coupled to the tab of the electrode assembly, wherein the first conductive tab is configured to electrically couple the electrode assembly to a battery terminal.

A second aspect of the disclosure a method of forming an electrode assembly, the method including: providing a jelly roll electrode having a plurality of electrode sheets, the plurality of electrode sheets including an anode sheet, a cathode sheet, and a separator separating the anode sheet from the cathode sheet, removing portions of the jelly roll electrode outside a subsection of the plurality of sheets, such that the remaining subsection of the plurality of electrode sheets projects axially from a body portion of the jelly roll electrode; forming a tab with the remaining subsection of the plurality of electrode sheets, wherein the tab includes the subsection of the plurality of electrode sheets contacting each other; coupling a first conductive tab to the tab, wherein the first conductive tab is configured to electrically couple the jelly roll electrode to a battery terminal; and injecting an electrolyte into the jelly roll electrode between the anode sheet and the cathode sheet.

A third aspect of the disclosure provides a battery including: a conductive battery casing, the conductive battery casing defining a first battery terminal; an electrode assembly within the conductive battery casing and having a centerline axis, the electrode assembly including: a jelly roll electrode having a plurality of electrode sheets, the plurality of electrode sheets including an anode sheet, a cathode sheet, and a separator separating the anode sheet from the cathode sheet, an electrolyte within the conductive battery casing and disposed between the anode sheet and the cathode sheet of the plurality of electrode sheets, and a first tab projecting from an axial end of the plurality of electrode sheets, the first tab including a subsection of the plurality of electrode sheets contacting each other at a first axial end of the jelly roll electrode; and a first conductive tab coupled to the first tab of the electrode assembly; and a cell cover positioned at an axial end of the conductive battery casing, and including a second battery terminal formed on a first surface of the cell cover and electrically coupled to the first conductive tab.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Figure 1:
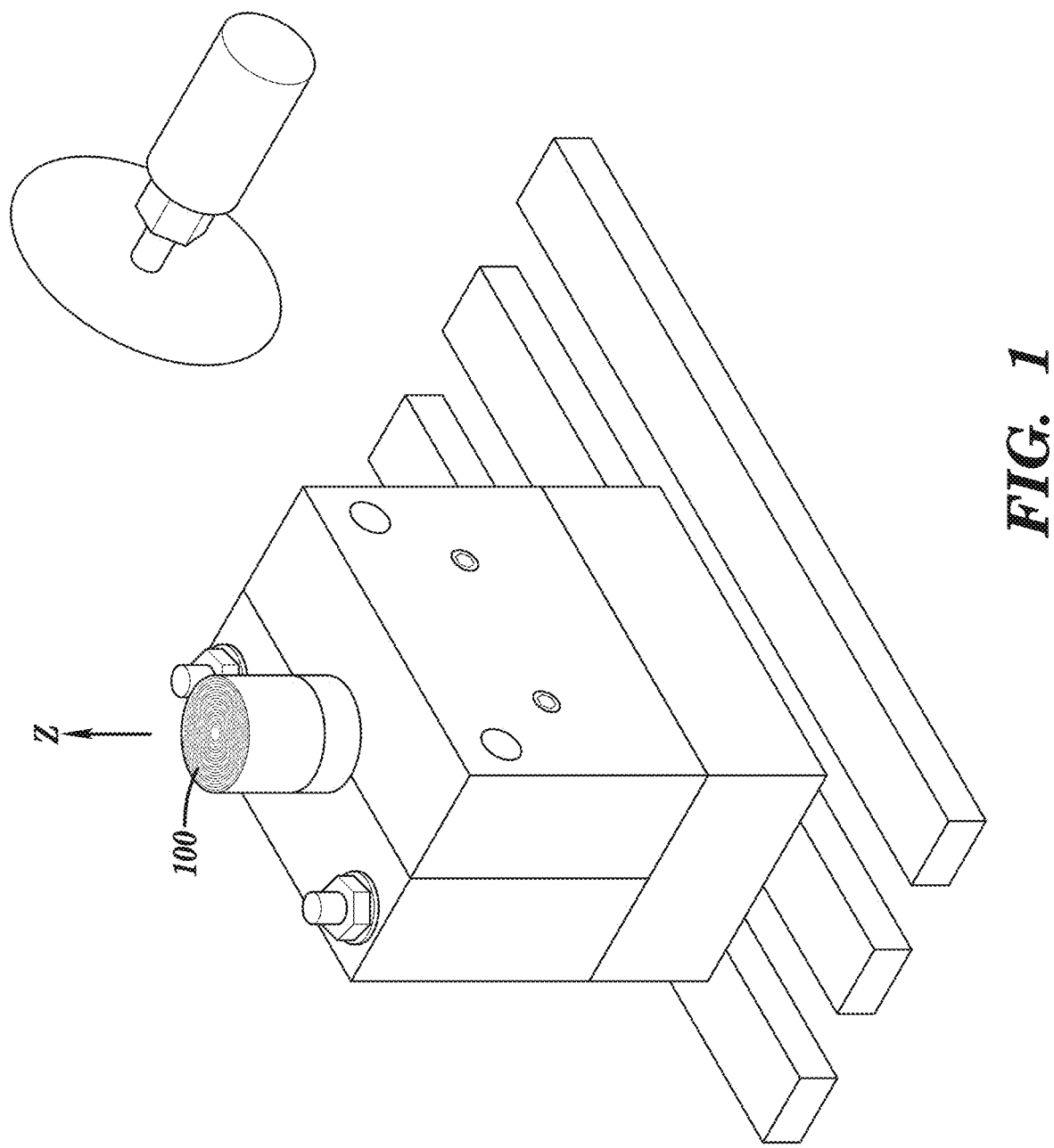
FIG. 1 shows a perspective view of a jelly roll electrode assembly before implementing embodiments of the disclosure.
Figure 2:
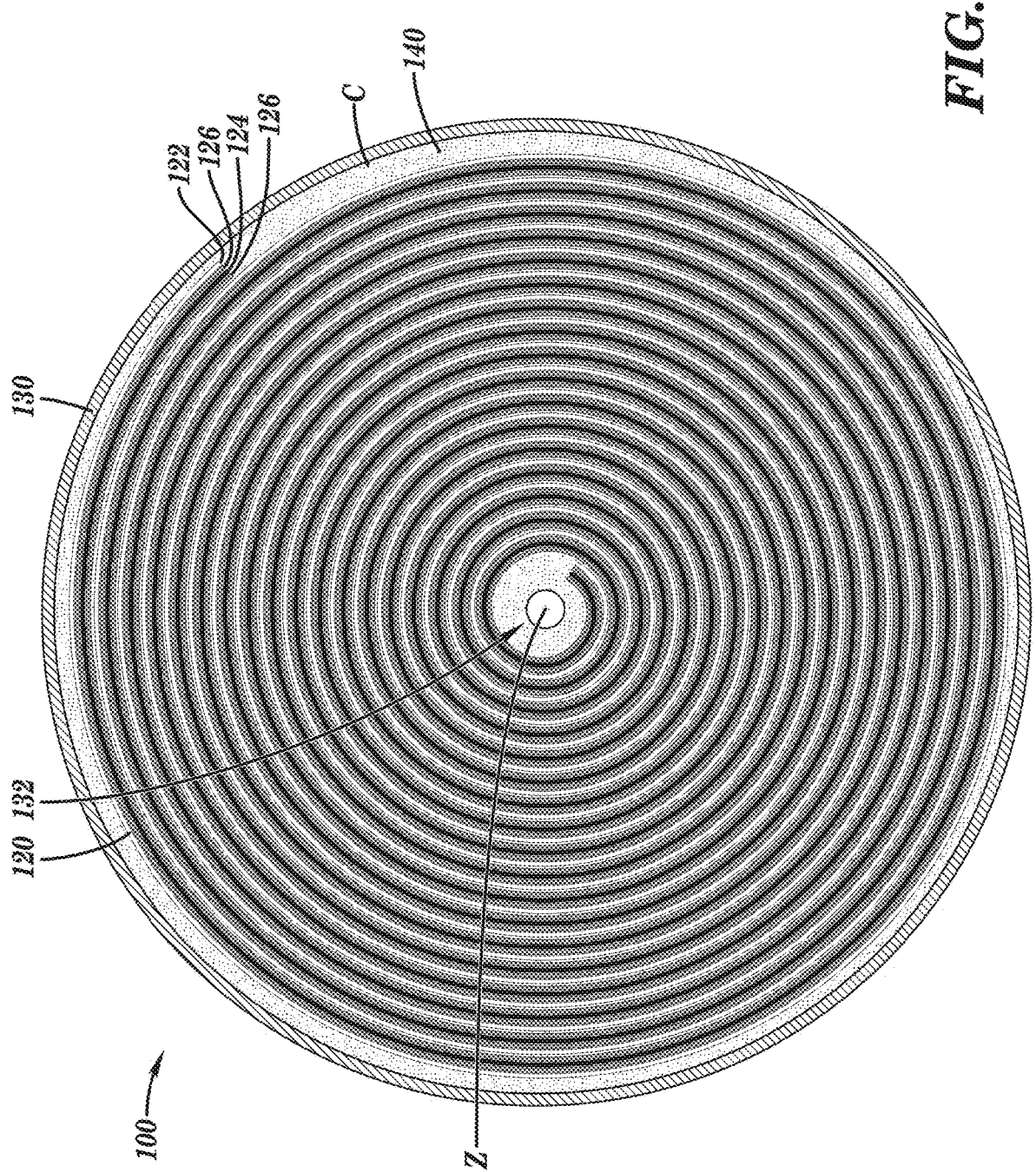
FIG. 2 shows a first cross-sectional view of a jelly roll electrode assembly before implementing embodiments of the disclosure.

Referring initially to FIGS. 1 and 2 together, a preliminary electrode assembly ("assembly" hereafter) 100 to be processed in embodiments of the disclosure is shown. FIG. 1 provides a perspective view of assembly 100. FIG. 2 provides a plan view of assembly 100. Assembly 100 may take the form of a jelly roll electrode assembly, alternatively known as a wound cylindrical cell configuration as noted elsewhere herein. Assembly 100 may have a centerline axis Z. Assembly 100 may include a precursor electrode 120 (FIG. 2) substantially aligned with centerline axis Z. Precursor electrode 120 may differ from electrodes of a complete electrode assembly by lacking terminal connections to a circuit, or by not yet being processed to a desired size or shape as discussed elsewhere herein. Precursor electrode 120 may be wound cylindrically about centerline axis Z to form the "jelly roll" shape noted elsewhere herein.

As shown in FIG. 2, the jelly roll shape of precursor electrode 120 may resemble a spiral. As shown in the plan view, the profile of electrode 120 may span from approximately the location of centerline axis Z toward an outer circumference C while and spiraling outward around centerline axis Z. By this configuration, assembly 100 may be structured for placement in a conductive battery casing 130, particularly within a hollow interior 132 of conductive battery casing 130, as discussed in further detail herein. Conductive battery casing 130 may be formed of, e.g., aluminum and/or nickel in raw form or plated onto another material, e.g., steel other materials suitable for electrically connecting various electrical materials to each other. As will be discussed in further detail herein, conductive battery casing 130 may form or include terminals for electrically connecting assembly 100 to various components in a circuit where the battery structure is deployed. Precursor electrode 120 may be placed inside conductive battery casing 130, and conductive battery casing 130 thereafter may be filled with an electrolyte 140. Electrolyte 140 may fluidly permeate precursor electrode 120 and form the anode-to-cathode connection of assembly 100 upon being formed inside conductive battery casing 130, as discussed herein.

Figure 3:
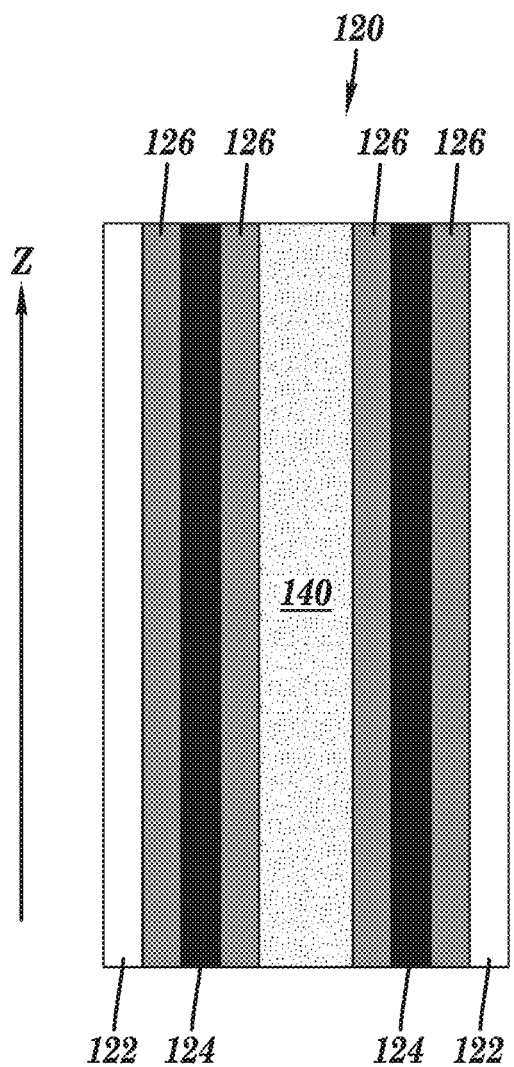
FIG. 3 shows a cut away partial perspective view of sheets in a jelly roll electrode assembly before implementing embodiments of the disclosure.
Figure 4:
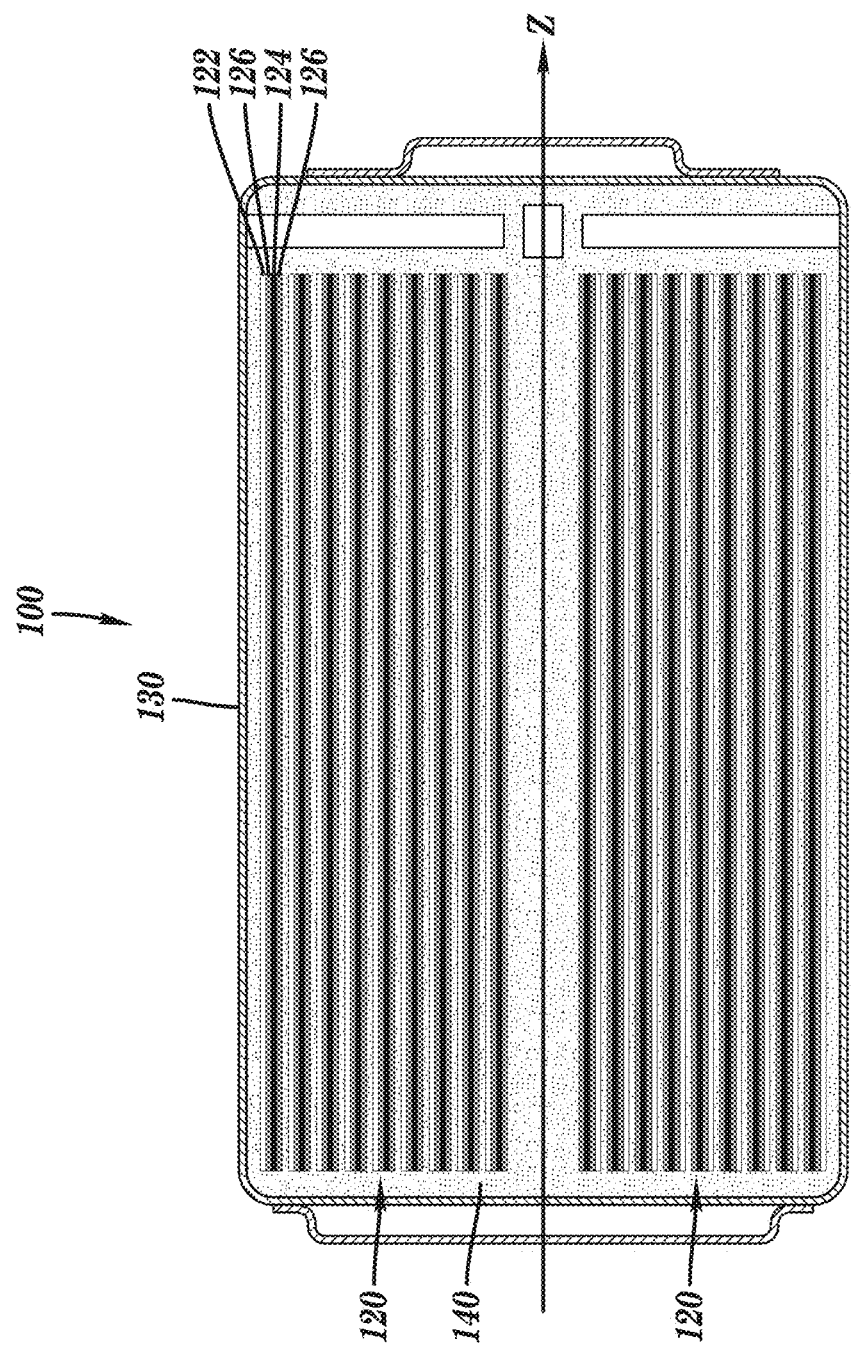
FIG. 4 shows an additional cross-sectional view of a jelly roll electrode assembly before implementing embodiments of the disclosure.

Referring to FIGS. 3 and 4, precursor electrode 120 may be subdivided into multiple sheets contacting each other along their laminar faces. The various sheets of precursor electrode 120 may include a cathode sheet 122, an anode sheet 124, and a separator 126 composed of an electrically insulative material positioned between cathode sheet 122 and anode sheet 124. Separator 126 may be an insulative sheet specifically designed to prevent electrical shorting between cathode sheet 122 and anode sheet 124. Separator 126 being positioned directly between cathode sheet 122 and anode sheet 124 forces ions to travel through electrolyte 140 when traveling from cathode sheet 122 to anode sheet 124. Separator 126 may be embodied as a solid, porous electronic insulator, e.g., polyolefin plastic or paper based.

During operation of assembly 100, current may flow through electrolyte 140 from cathode sheet 122 to anode sheet 124. It is thus emphasized that separator 126 is chemically and structurally distinct from electrolyte 140 by preventing ions from flowing therethrough, as compared to electrolyte 140 which assists ion travel from cathode sheet 122 to anode sheet 124. The solution of electrolyte 140 fluidly permeates separator 126 and the active layers precursor electrode 120, which are also porous in various embodiments. Electrolyte 140 serves as a medium for ionic transfer between cathode sheet 122 and anode sheet 124. The parallel flux of electrons traverses through the active electrode layers (which typically have additives of carbon to improve their electronic conductivity) and is gathered on the foil current collectors of the electrodes on their way to the terminals of the cell to power an external circuit. Assembly 100 thus provides the fundamental components of an electrode assembly when placed inside conductive battery casing 130 with electrolyte 140. Cathode sheet 122 and anode sheet 124 may each be composed of different metals (e.g., aluminum and lithium, respectively), or in some cases may include the same metal (e.g., aluminum in some implementations). Separator 126 may include any currently known or later developed dielectric material or group of dielectric materials formed into a sheet between cathode and anode sheets 122, 124. Electrode 140 fluidly permeates each sheet 122, 124 and separator 126.

Assembly 100 and conductive battery casing 130 may be sized to meet standard values for a particular electrode assembly. For instance, casing 130 may have substantially the same length as two "D-cell" batteries stacked end-to-end (i.e., approximately 123 centimeters (cm)) and thus may be known as a "Double D" battery assembly. In this case, precursor electrode 120 and each sheet 122, 124, 126 when unrolled may have an end-to-end length of approximately three meters. After being rolled and condensed into the jelly roll shape, precursor electrode 120 may have a diameter of approximately thirty-three millimeters (mm) when wound about centerline axis C.

Figure 5:
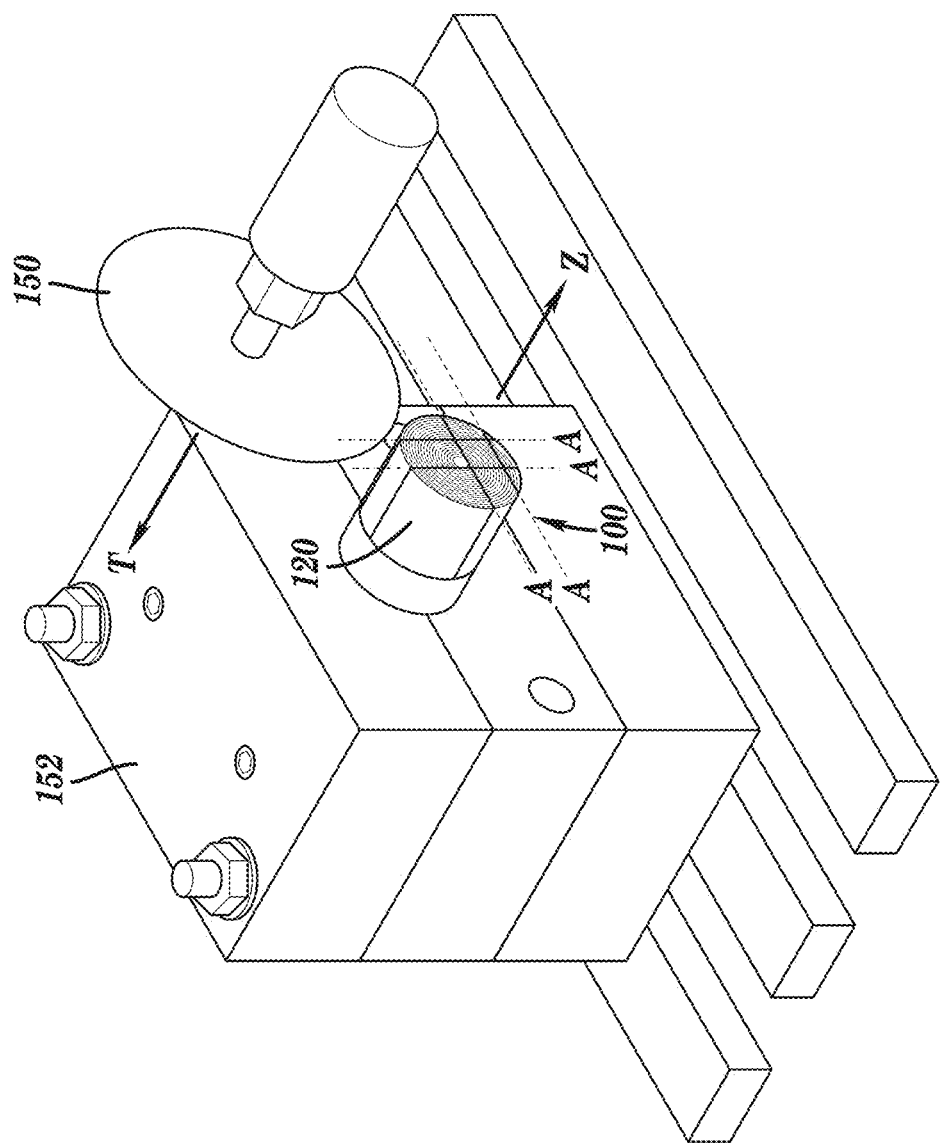
FIG. 5 shows a perspective view of removing portions of a jelly roll electrode assembly in embodiments of the disclosure.

Turning to FIG. 5, the disclosure provides methods to manufacture an electrode assembly from precursor electrode 120 to form electrical couplings to other portions of a circuit. The resulting apparatus structure may lack intermediate coupling components typically required for jelly roll electrode assemblies to function. As shown in FIG. 5, embodiments of the disclosure use selected portions of precursor electrode 120 to form tabs for connecting precursor electrode 120 to other electrical components. Various portions of precursor electrode 120 may be cut and removed automatically via one or more manufacturing tools, and/or manually in non-scalable implementations, such that only a targeted remainder of precursor electrode 120 axially projects from assembly 100.

Precursor electrode 120 may be machined with the aid of one or more cutting tools 150. Cutting tool 150 may be oriented substantially perpendicularly with respect to centerline axis Z, but the orientation of cutting tool 150 may vary based on the specific tooling used. Cutting tool 150 may be included as part of a larger manufacturing assembly for automatically forming batteries and electrode assemblies according to the disclosure. Cutting tool 150 may include one or more currently known or later developed tools capable of targeting and removing length-wise portions of assembly 100. Cutting tool 150 may include, e.g., a rotary or non-rotary cutter such as a circular saw, non-circular saw, and/or other devices for cutting a material along a centerline axis T of cutting tool 150.

Cutting tool 150 may be axially displaced from one end of precursor electrode 120 to remove a predetermined amount of material from precursor electrode 120. According to an example, cutting tool 150 may cut assembly 100 along line(s) A within a plane distal to one axial end of precursor electrode 120. An example set of cutting paths along four line(s) A are shown in FIG. 5 as an example, and it is understood that more or less lines of cutting may be used in different embodiments. The movement of cutting tool 150 along line(s) A thus may separate and remove non-targeted portions of precursor electrode 120. A remainder of precursor electrode 120 extending axially outward from assembly 100 at a targeted location.

Assembly 100 may be mounted on a mounting fixture 152 (e.g., a stationary stand) to hold assembly 100 in place during manufacture. For volume production applications, one or more assemblies 100 may be placed in mounting fixtures 152, while cutting tool 150 may cut each assembly via a robot arm or similar programmable device configured to make cuts along specified lines of movement, and to predetermined dimensions. It is understood that precursor electrode 120 may be cut differently by changing the cutting path(s), represented by line(s) A, to produce different shapes and/or sizes.

Figure 6:
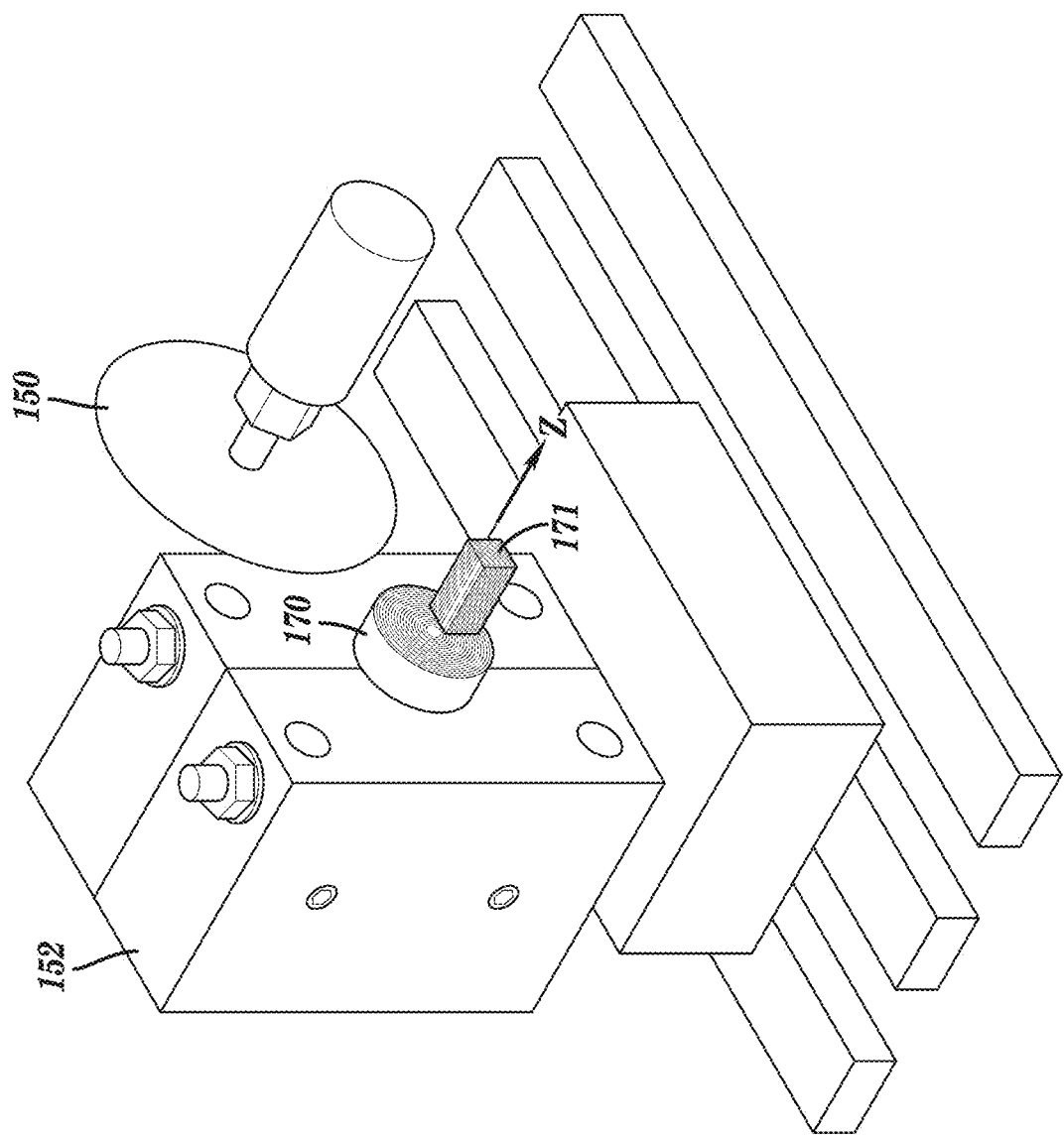
FIG. 6 shows a perspective view of a jelly roll electrode assembly with a remaining subsection in embodiments of the disclosure.

Referring now to FIG. 6, a jelly roll electrode assembly (simply "assembly" hereafter) 170 may be substantially aligned with centerline axis Z. Assembly 170 may be formed from same individual sheets 122, 124, 126 (FIG. 3) as precursor electrode 120 (FIGS. 2-5), each of which may be wound into a cylindrical profile. A subsection of electrode sheets (simply "subsection" hereafter) 171 may be formed from portions of precursor electrode 120 which have not been cut with cutting tool 150. Subsection 171 may project outwardly from an axial end of assembly 170. Each sheet in subsection 171 may be structurally distinct from each other as a result of the cutting. According to one example, at least approximately fifty distinct sheets 122, 124, 126 (FIG. 3) may be included within one subsection 171. To form an electrode assembly according to the present disclosure, sheets within subsection 171 may be subsequently subjected to a lateral compressive force. The compressive force may bring adjacent sheets into contact with each other to form a tab.

Figure 7:
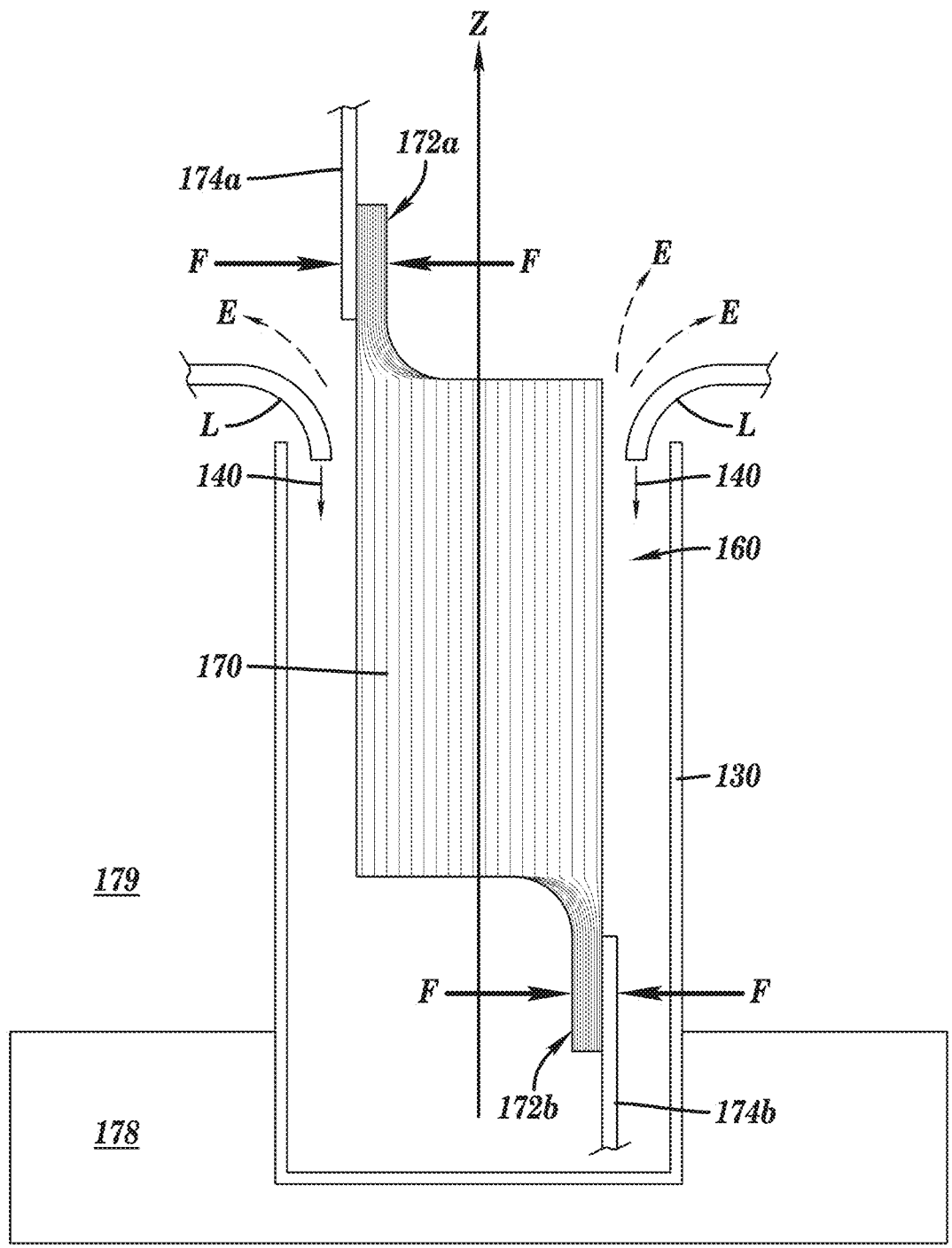
FIG. 7 shows a cross-sectional view of forming a tab for an electrode assembly from remaining subsections of the jelly roll electrode assembly in embodiments of the disclosure.

Turning to FIG. 7, processes to form other components of an electrode assembly 160 according to the disclosure are shown. According to an example, a pair of tabs 172 (identified individually as first tab 172a, second tab 172b) may be formed at respective axial ends of assembly 170. Each tab 172a, 172b may be formed from one subsection 171 (FIG. 7). Tabs 172 may be formed at opposite axial ends of assembly 170 to electrically connect to opposite-polarity terminals of a battery. As shown in FIG. 7, forming tabs 172 may include applying a lateral force F (i.e., perpendicular with respect to centerline axis Z) to subsection(s) 171. Lateral force F may bring the various sheets of each subsection into contact with each other. The applying of lateral force F will bend subsection 171 into tabs 172, reducing the separation distance between sheets in each tab 172 to less than in assembly 170. Upon being formed, tabs 172 may include the same sheets of material included in assembly 170, e.g., as shown in FIG. 3, but with substantially reduced separation between each set of sheets therein. In some cases, each tab 172 may project outwardly from assembly 170 in substantial alignment with the circumferential periphery of assembly 170, but this is not required in all implementations. According to an example, each tab 172a, 172b may project from assembly 170 in parallel with centerline axis Z, and without being aligned with each other and/or centerline axis Z.

Continued processing of electrode assembly 160 may include electrically coupling assembly 170 to other electrical components through tabs 172a, 172b. The electrical coupling from assembly 170 to other components may be provided using a set of conductive tabs 174, identified individually as a first conductive tab 174a and a second conductive tab 174b. Conductive tabs 174a, 174b may act as opposite-polarity current collectors in an electrode assembly. Conductive tabs 174a, 174b may be substantially identical in shape and composition, and are identified separately solely based on the components to which they may connect as discussed in further detail herein. Conductive tabs 174a, 174b may include one or more metals suitable to form a conductive pathway between two or more conductive elements. According to an embodiment, conductive tabs 174a, 174b may be formed of nickel, copper, and/or other weldable metals. It is possible to join each conductive tab 174a, 174b to a respective tab 172a, 172b, for example, through welding. Ultrasonic welding, in particular, may be suitable to mechanically and electrically couple copper sheets in each tab 172a, 172b to nickel and/or other metals in conductive tabs 174a, 174b. Other forms of welding, e.g., resistance welding, laser welding, etc., may be suitable to electrically and mechanically connect tab(s) 172a, 172b to conductive tab(s) 174a, 174b.

To weld each tab 172a, 172b to each conductive tab 174a, 174b of electrode assembly 160, the sheets of each tab 172a, 172b may be subjected to welding (e.g., ultrasonic welding) after one or more sheets are pushed against conductive tab 174a, 174b. An ultrasonic welding apparatus thus may join contacting sheets within tab 172a, 172b to each other, and will also weld conductive tab 174a, 174b to tab 172a, 172b via a single application of ultrasonic welding. It is understood that conductive tab(s) 172 may be welded to tab(s) 172 via non-ultrasonic welding, and/or by other techniques for mechanically and electrically coupling two metals to each other. In the case of tab 172b, second conductive tab 174b may be subsequently welded to interior surfaces of conductive battery casing 130. In any case, the coupling of conductive tabs 174a, 174b to tabs 172a, 172b by welding may also mechanically couple adjacent sheets within each tab 172a, 172b to each other.

Assembly 170 and tabs 172a, 172b may need to be dried to allow proper filling and setting of electrolyte 140 within conductive battery casing 130. The drying may be implemented by placing assembly 170 within conductive battery casing 130 after forming tabs 172a, 172b and conductive tabs 174a, 174b. Conductive battery casing 130 may, in turn, be mounted onto a drying assembly 178 (e.g., a mounting block), which may include or be provided in a vacuum chamber 179 to extract moisture from within conductive battery casing 130, assembly 170, and tabs 172, 172b. Drying assembly 178 may have an adjustable temperature by including or being in thermal communication with one or more heat sources (e.g., electric heaters, heat exchangers, chemical heaters, etc.) configured to raise the temperature of components mounted thereon. Drying assembly 178 thus may raise the temperature of conductive battery casing 130, assembly 170, tabs 172*a*, 172*b*, and/or conductive tabs 174*a*, 174*b* to a temperature suitable for removing moisture, herein referred to as a "drying temperature." Drying assembly 178 may also be selectable between a heating mode and a cooling mode by including or otherwise being in thermal communication with one or more cooling sources.

To remove moisture from electrode assembly 160, drying assembly 178 may heat each component to a selected drying temperature (e.g., approximately 85° C.) and then apply a vacuum at the drying temperature. The vacuum may be applied over a set time period, e.g., over several hours or over several days in some cases. Conventional design rules discourage the modifying of precursor electrodes 120 out of concern for the eventual drying of a cell. However, it has been determined that tabs 172*a*, 172*b* and conductive tabs 174*a*, 174*b* will not impede the drying process.

To continue forming electrode assembly 160, electrolyte 140 is injected into assembly 170 to create an electrical pathway between the various sheets included therein. Specifically, electrolyte 140 provides a medium for allowing ions to travel between cathode sheets 122 (FIG. 3) and anode sheets 124 of assembly 170 as discussed above. Electrolyte 140 may be injected after assembly 170 and tabs 172 are placed inside conductive battery casing 130, e.g., by injection of liquid along injection conduits L shown in FIG. 7. Electrolyte 140 may be injected through conduits L while assembly 170 remains inside vacuum chamber 179. To allow electrolyte 140 to be injected into assembly 170, injection conduits L may be placed within vacuum chamber 179, and electrolyte 140 may be injected through conduits L after the drying process concludes.

FIG. 7 depicts injecting electrolyte 140, e.g., a liquid electrolyte material, into assembly 170 to form the electrical pathway for an electrode assembly. Electrolyte 140 may include any electrolytic compound appropriate for use with assembly 170 and may include any currently known or later developed electrolytes suitable for jelly roll batteries, e.g., lithium and/or copper-based electrode assemblies. More specifically, electrolyte 140 may include, e.g., various forms of lithium salt ($LiPF_6$, $LiBF_4$, $LiClO_4$) and/or other liquid electrolyte materials capable of being injected into assembly 170. The injected electrolyte 140 may enter assembly 170 and occupy any space between the various sheets, as shown in FIG. 3.

Figure 8:
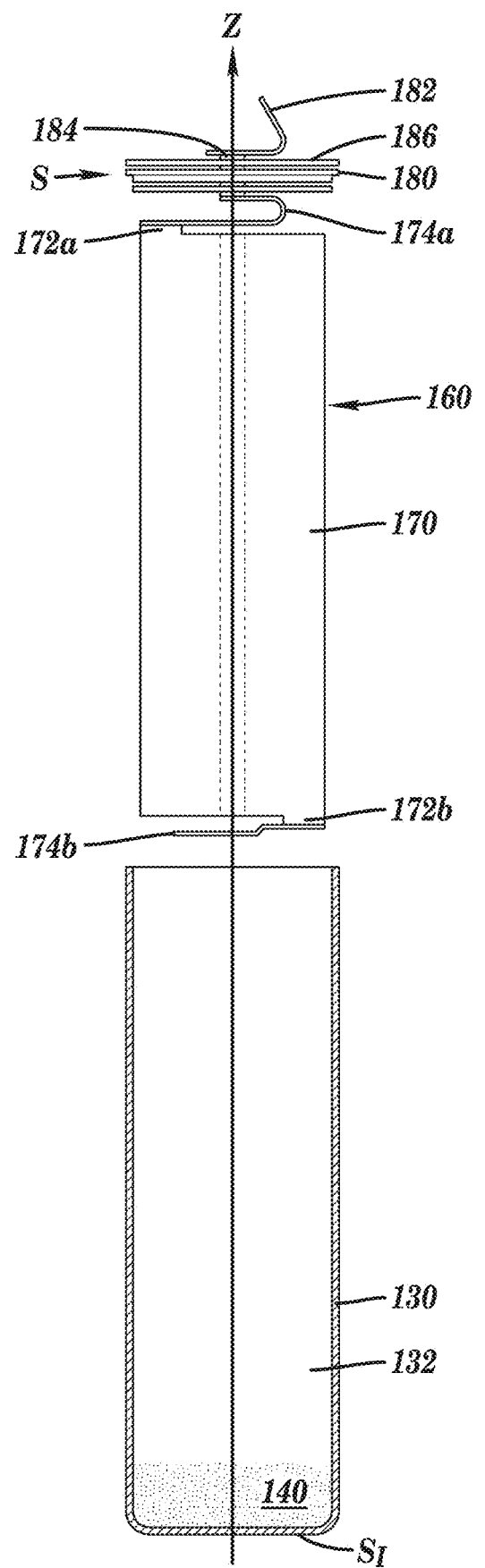
FIG. 8 shows a side view of placing an electrode assembly in a conductive housing methods according to embodiments of the disclosure.

Tuning to FIG. 8, electrode assembly 160 may be coupled to various components for sealing its contents and forming an electrical connection to a circuit. FIG. 8 provides an assembly view of electrode assembly 160 with additional components to further illustrate the structural relationships between various elements of an electrode assembly. Continued processing may include, e.g., placing assembly 170 into conductive battery casing 130 and sealing assembly 170 within hollow interior 132 of conductive battery casing 130 through a cell cover 180. Hollow interior 132 of conductive battery casing may have a substantially cylindrical profile. The outer diameter of conductive battery casing 130 may be slightly larger than that of assembly 170, e.g., at least approximately thirty-five millimeters. Conductive battery casing 130, however formed, may be sized to hold one or more electrodes 170 and the injected electrolyte 140 therein.

As shown, first conductive tab 174*a* of electrode assembly 160 may be coupled to cell cover 180. Cell cover 180 may include a conductive material to allow electrical current to pass from first conductive tab 174*a* to other elements connected to cell cover 180. Thus, cell cover 180 may include one or more of the conductive elements included in first and/or second conductive tab(s) 174. In turn, cell cover 180 may include a terminal tab 182 to form the exterior electrical connection of an electrode assembly. Terminal tab 182 may be electrically connected to first conductive tab 174*a* through the metallic composition of cell cover 180, or through other conductive elements extending through cell cover 180. Cell cover 180 may be structured to hermetically seal assembly 170 and electrolyte 140 within conductive battery casing 130. More specifically, cell cover 180 may circumferentially contact and engage conductive battery casing 130 at least partially within hollow interior 132, thereby causing cell cover 180 to seal conductive battery casing 130 along its inner circumference. The sealing of conductive battery casing 130 with cell cover 180 may protect electrolyte 140 from contamination, and block moisture and/or other contaminants from entering assembly 170.

Figure 9:
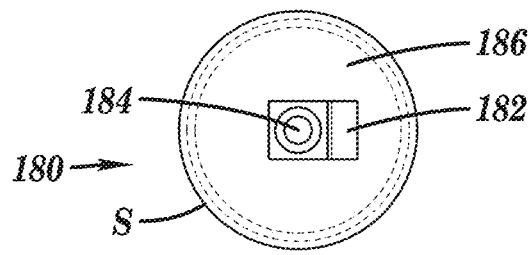
FIG. 9 shows a plan view of a cell cover of an electrode assembly according to embodiments of the disclosure.

Turning now to FIGS. 8 and 9 together, additional features of cell cover 180 are discussed. It is emphasized that conductive battery casing 130 may form one of two oppositely-charged terminals for an electrode assembly. Thus, cell cover 180 having a circumferential surface S may include features for electrically separating two oppositely-charged terminals in a single structure. Cell cover 180 may include a cover terminal 184 extending axially through cell cover 180. Cover terminal 184 may include one or more conductive metals, and may be coupled to first conductive tab 174*a* at one end and terminal tab 182 at its opposite end. To prevent electrical shorting between cover terminal 184 and conductive portions of cell cover 180 at circumferential surface S, a terminal insulator 186 may be formed on cell cover 180 on its second, exterior surface. Terminal insulator 186 may include one or more dielectric compounds configured to prevent electrical currents from forming on the exterior surface of cell cover 180. Terminal insulator 186 may include one or more oxide or nitride materials, and/or other dielectric materials currently known or later developed. Furthermore, terminal insulator 186 may have a geometrical profile similar to that of cell cover 180, and in some cases may be formed in the shape of a washer. In this case, cover terminal may be located circumferentially within terminal insulator 186. Terminal insulator 186 may allow the exterior of conductive battery casing 130 to function as a terminal connection to second conductive tab 174*b* by electrically isolating cover terminal 184. Terminal tab 182 may extend outwardly away from cell cover 180 to form an electrical coupling to other portions of a circuit.

Figure 10:
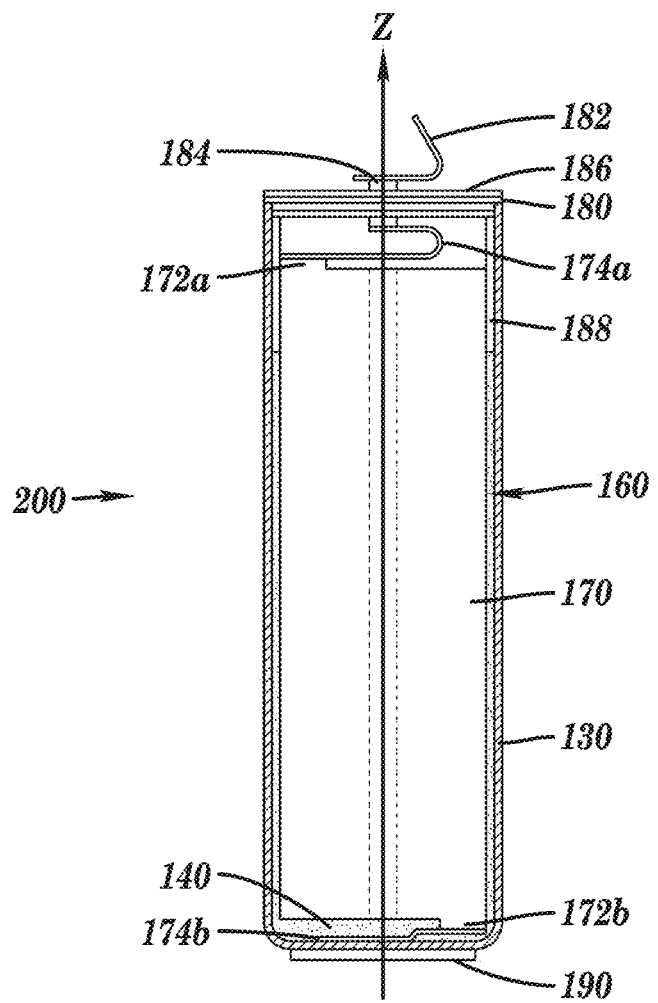
FIG. 10 shows a schematic view of an electrode assembly and battery according to embodiments of the disclosure.

Proceeding to FIG. 10, cell cover 180 is shown to be mounted on conductive battery casing 130. To further protect and insulate first conductive tab 174*a* from conductive battery casing 130, an insulative barrier 188 may be formed on the circumferential interior of conductive battery casing 130 near the location of first tab 172*a* and first conductive tab 174*a*. Insulative barrier 188 may include one or more adhesive materials to mechanically bond to the interior of conductive battery casing 130 without additional mechanical fasteners and/or other components. In an example, insulative barrier 188 may include polytetrafluoroethylene (PTFE). Insulative barrier 188 may also provide additional hermetic sealing of electrolyte 140 and assembly 170 within conductive battery casing 130. Further processing to form an electrode assembly may also include coupling conductive battery casing 130 to a terminal 190. Terminal 190 may form the opposite electrical connection to second conductive tab 174 through conductive battery casing 130. It is understood that terminal 190 may also be electrically coupled to conductive battery casing 130 through one or more intermediate conductive electrical components.

The various processes discussed herein thus may be form a battery 200 according to embodiments of the disclosure. Conductive battery casing 130 may be substantially cylindrical, with centerline axis Z as shown. The components of electrode assembly 160 may be located inside conductive battery casing 130. Assembly 170 of battery 200 may be substantially aligned with centerline axis Z, and may include a plurality of individual sheets as discussed elsewhere herein and shown specifically in FIG. 3. The various sheets of assembly 170 may include cathode sheet 122 (FIG. 3) and anode sheet 124 (FIG. 3) with separator 126 (FIG. 3) therebetween. Conductive battery casing 130 may also include electrolyte 140 therein, which may form an electrical pathway between the various sheets of electrode assembly 160. Electrode assembly 160 of battery 200 may also include first tab 172a projecting from an axial end of assembly 170. As discussed, first tab 172a includes a subset of electrode sheets projecting axially from assembly 170. Adjacent sheets of first tab 172 may contact each other along their laminar faces. First conductive tab 174a may electrically couple the sheets of first tab 172a together, and moreover may form an electrical pathway from assembly 170 to cover terminal 184. Cover terminal 184 of cell cover 180 may be electrically coupled to terminal tab 182 to create an electrical pathway to other components outside battery 200. Terminal insulator 186 of cell cover 180 may electrically isolate cover terminal 184 from conductive battery casing 130.

Battery 200 may include additional electrical coupling components of assembly 170 at an opposing axial end with respect to first tab 172a. Second tab 172b may be formed identically to that of first tab 172a at an axially opposing end of assembly 170. Second conductive tab 174b, in addition, may form an electrical pathway between second tab 172b of assembly 170 to conductive battery casing 130. Conductive battery casing 130 may be electrically coupled to terminal 190 for defining an opposite-polarity terminal of battery 200. Various embodiments of electrode assembly 160 and battery 200 may convert portions of assembly 170 into termination components for linking battery 200 to other devices. The various embodiments discussed herein thus avoid the use of additional, intervening components at axial ends of assembly 170 by converting portions of the sheets therein into tabs 172a, 172b. Additionally, the forming of tabs 172a, 172b from assembly 170 will not impede the drying of electrode assembly 160 and injecting of electrolyte 140 therein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An electrode assembly comprising:
   an electrode assembly including:
   a jelly roll electrode having a plurality of electrode sheets, the plurality of electrode sheets including an anode sheet, a cathode sheet, and a separator separating the anode sheet from the cathode sheet,
   an electrolyte disposed between the anode sheet and the cathode sheet of the jelly roll electrode, and
   a tab projecting from an axial end of the plurality of electrode sheets, the tab including a subsection of the plurality of electrode sheets contacting each other at an axial end of the jelly roll electrode; and
   a first conductive tab coupled to the tab of the electrode assembly, wherein the first conductive tab is configured to electrically couple the electrode assembly to a battery terminal.

2. The electrode assembly of claim 1, wherein the jelly roll electrode and the electrolyte are housed within a cylindrical casing.

3. The electrode assembly of claim 2, wherein the tab is substantially aligned with a circumferential periphery of the jelly roll electrode.

4. The electrode assembly of claim 1, further comprising a cell cover having a first surface coupled to the first conductive tab, wherein the cell cover includes a terminal tab mounted on a second surface of the cell cover opposite the first surface.

5. The electrode assembly of claim 1, wherein the first conductive tab comprises nickel (Ni).

6. The electrode assembly of claim 1, wherein a separation distance between the plurality of electrode sheets within the jelly roll electrode is greater than a separation distance between the plurality of electrode sheets within the tab, and wherein the separation distance between the plurality of electrode sheets decreases between the jelly roll electrode and the tab according to embodiments of a predetermined profile.

7. The electrode assembly of claim 1, wherein the first conductive tab is coupled to the tab of the electrode assembly through a weld.

8. A method of forming an electrode assembly, the method comprising:
providing a jelly roll electrode having a plurality of electrode sheets, the plurality of electrode sheets including an anode sheet, a cathode sheet, and a separator separating the anode sheet from the cathode sheet;
removing portions of the jelly roll electrode outside a subsection of the plurality of sheets, such that the remaining subsection of the plurality of electrode sheets projects axially from a body portion of the jelly roll electrode;
forming a tab with the remaining subsection of the plurality of electrode sheets, wherein the tab includes the subsection of the plurality of electrode sheets contacting each other;
coupling a first conductive tab to the tab, wherein the first conductive tab is configured to electrically couple the jelly roll electrode to a battery terminal; and
injecting an electrolyte into the jelly roll electrode between the anode sheet and the cathode sheet.

9. The method of claim 8, wherein forming the tab with the remaining subsection of the plurality of electrode sheets reduces a separation distance between the plurality of sheets relative to a separation between the plurality of electrode sheets in the jelly roll electrode.

10. The method of claim 8, further comprising:
inserting the jelly roll electrode and the conductive tab into a conductive battery casing; and
coupling a first surface of the cell cover to the first conductive tab, wherein the cell cover includes a terminal tab mounted on a second surface of the cell cover opposite the first surface.

11. The method of claim 10, further comprising mounting a terminal insulator on the second surface of the cell cover, after coupling the cell cover to the first conductive tab.

12. The method of claim 8, further comprising:
inserting the jelly roll electrode into a conductive battery casing; and
removing moisture from the electrode assembly within the conductive battery casing before injecting the electrolyte into the jelly roll electrode.

13. The method of claim 12, wherein removing moisture from the jelly roll electrode within the battery casing includes:
raising a temperature of the jelly roll electrode to a drying temperature; and
applying a vacuum to dry the jelly roll electrode.

14. The method of claim 8, wherein coupling the first conductive tab to the tab of the jelly roll electrode includes ultrasonically welding the conductive tab to the tab of the jelly roll electrode.

15. A battery comprising:
a conductive battery casing, the conductive battery casing defining a first battery terminal;
an electrode assembly within the conductive battery casing and having a centerline axis, the electrode assembly including:
a jelly roll electrode having a plurality of electrode sheets, the plurality of electrode sheets including an anode sheet, a cathode sheet, and a separator separating the anode sheet from the cathode sheet,
an electrolyte within the conductive battery casing and disposed between the anode sheet and the cathode sheet of the plurality of electrode sheets, and
a first tab projecting from an axial end of the plurality of electrode sheets, the first tab including a subsection of the plurality of electrode sheets contacting each other at a first axial end of the jelly roll electrode; and
a first conductive tab coupled to the first tab of the electrode assembly; and
a cell cover positioned at an axial end of the conductive battery casing, and including a second battery terminal formed on a first surface of the cell cover and electrically coupled to the first conductive tab.

16. The battery of claim 15, further comprising a terminal insulator disposed about the second battery terminal, and electrically insulating the second battery terminal from the conductive battery casing.

17. The battery of claim 15, wherein the conductive battery casing is cylindrical, and wherein the first tab is substantially aligned with a circumferential periphery of the jelly roll electrode.

18. The battery of claim 15, wherein the first conductive tab is coupled to the first tab of the electrode assembly through a weld.

19. The battery of claim 15, further comprising:
a terminal tab coupled to the second battery terminal at a second surface of the cell cover opposite the first surface; and
a terminal insulator formed on the second surface of the cell cover.

20. The battery of claim 15, further comprising:
a second tab projecting from a second axial end of the plurality of electrode sheets opposite the second opposite end, the first tab including a subsection of the plurality of electrode sheets contacting each other at a second axial end of the jelly roll electrode opposite the first axial end; and
a second conductive tab electrically coupling the plurality of electrode sheets to the conductive battery casing through the second tab.

* * * * *